United States Patent
Wurzer

(10) Patent No.: US 10,621,194 B2
(45) Date of Patent: Apr. 14, 2020

(54) AUTOMATED HARMONIZATION OF DATA

(71) Applicant: IQSER IP AG, Bassersdorf (CH)

(72) Inventor: Joerg Wurzer, Remscheid (DE)

(73) Assignee: IQSER, IP AG, Bassersdorf (CH)

( * ) Notice: Subject to any disclaimer, the term of this patent is extended or adjusted under 35 U.S.C. 154(b) by 447 days.

(21) Appl. No.: 15/024,187

(22) PCT Filed: Sep. 22, 2014

(86) PCT No.: PCT/EP2014/070141
§ 371 (c)(1),
(2) Date: Mar. 24, 2016

(87) PCT Pub. No.: WO2015/044090
PCT Pub. Date: Apr. 2, 2015

(65) Prior Publication Data
US 2016/0232216 A1    Aug. 11, 2016

(30) Foreign Application Priority Data

Sep. 24, 2013   (DE) ................. 10 2013 110 571

(51) Int. Cl.
*G06F 17/00* (2019.01)
*G06F 16/25* (2019.01)
*G06F 16/242* (2019.01)
*G06F 16/27* (2019.01)
*G06F 16/22* (2019.01)

(52) U.S. Cl.
CPC ........ *G06F 16/258* (2019.01); *G06F 16/2228* (2019.01); *G06F 16/243* (2019.01); *G06F 16/275* (2019.01)

(58) Field of Classification Search
None
See application file for complete search history.

(56) References Cited

U.S. PATENT DOCUMENTS

| | | | |
|---|---|---|---|
| 5,970,490 A | 10/1999 | Morgenstern | |
| 8,275,810 B2 * | 9/2012 | Barton | G06F 16/288 |
| | | | 707/803 |

(Continued)

FOREIGN PATENT DOCUMENTS

| | | |
|---|---|---|
| WO | 2004/053645 | 6/2004 |
| WO | 2009/030247 | 3/2009 |

OTHER PUBLICATIONS

Witold.*

(Continued)

*Primary Examiner* — Hung D Le
(74) *Attorney, Agent, or Firm* — Grossman, Tucker, Perreault & Pfleger, PLLC

(57) ABSTRACT

The present invention relates to a method and a system for automated harmonization of data that are present in different formats and/or of data models from various heterogeneous data sources or databases, using semantic middleware for data integration and content-oriented data analysis, wherein data from connected data sources are synchronized to the middleware, and the content of said data subjected to semantic analysis and their semantic typing and designations for attributes are harmonized as meta data, preferably such that the superordinate abstract data model of the integrated data is incrementally extended and harmonized.

10 Claims, 7 Drawing Sheets

(56) References Cited

U.S. PATENT DOCUMENTS

| | | | |
|---|---|---|---|
| 8,516,456 B1* | 8/2013 | Starovoitov | G06F 8/427 |
| | | | 717/141 |
| 8,606,726 B2 | 12/2013 | Wurzer | |
| 2005/0075996 A1* | 4/2005 | Dettinger | G06F 16/2428 |
| 2006/0136452 A1* | 6/2006 | Lim | G06F 17/30292 |
| 2006/0209797 A1* | 9/2006 | Anisimov | H04L 29/06 |
| | | | 370/352 |
| 2006/0259442 A1* | 11/2006 | Iqbal | G06F 17/30289 |
| | | | 705/400 |
| 2006/0271574 A1* | 11/2006 | Villaron | G06F 9/465 |
| 2007/0112586 A1* | 5/2007 | Dettinger | G16H 10/60 |
| | | | 705/2 |
| 2009/0282042 A1 | 11/2009 | Russell et al. | |
| 2011/0040805 A1* | 2/2011 | Carter | G06F 17/30867 |
| | | | 707/808 |
| 2012/0089562 A1* | 4/2012 | Deremigio | G06F 17/30563 |
| | | | 707/602 |
| 2013/0086095 A1* | 4/2013 | Barton | G06F 16/288 |
| | | | 707/758 |
| 2014/0025650 A1* | 1/2014 | Lee | G06F 17/211 |
| | | | 707/694 |

OTHER PUBLICATIONS

Esser et al., "Automatic Indexing of Scanned Documents—a Layout-based Approach", German Federal Ministry of Education and Research, pp. 1-8, 2012, Germany.

Ferrilli et al., "FOL Learning for Knowledge Discovery in Documents", Chapter 16, pp. 348-374, 2010, Italy.

Murugappan et al., "A survey of keyword spotting techniques for printed document images", Artif Intell Rev, vol. 35, pp. 119-136, 2010, India.

English translation of International Search Report from corresponding PCT application No. PCT/EP2014/070141 dated Dec. 12, 2014.

* cited by examiner

```xml
<?xml version="1.0"?>
<map>
    <entry>
        <string>Leads.Contact</string>
        <map>
            <entry>
                <string>COMPANY</string>
                <string>FIRMA</string>
            </entry>
            <entry>
                <string>ZIP</string>
                <string>ARBEIT_PLZ</string>
            </entry>
            <entry>
                <string>NAME</string>
                <string>NACHNAME</string>
            </entry>
            <entry>
                <string>SURNAME</string>
                <string>VORNAME</string>
            </entry>
            <entry>
                <string>UID</string>
                <string>UID</string>
            </entry>
            <entry>
                <string>EMAIL</string>
                <string>ARBEIT_E-MAIL</string>
            </entry>
            <entry>
                <string>CITY</string>
                <string>ARBEIT_STADT</string>
            </entry>
            <entry>
                <string>STREET</string>
                <string>ARBEIT_STRASSE</string>
            </entry>
            <entry>
                <string>TYPE</string>
                <string>Kontakt</string>
            </entry>
            <entry>
                <string>TITLE</string>
                <string>POSITION</string>
            </entry>
        </map>
    </entry>
</map>
```

Fig. 4

AUTOMATED HARMONIZATION OF DATA

CROSS REFERENCE TO RELATED APPLICATIONS

This is a U.S. National Phase Application under 35 U.S.C. § 371 of International Patent Application No. PCT/EP2014/070141 filed Sep. 22, 2014, which claims the benefit of German Patent Application No. 10 2013 110 571.8 filed on Sep. 24, 2013, both of which are incorporated by reference herein.

FIELD OF THE INVENTION

The present invention relates to a method and a system for automated harmonization of data that are present in different formats and of data models from various heterogeneous data sources or databases.

BACKGROUND

The integration of heterogeneous data sources in IT systems is highly complex to this day, in particular because data from different, distributed sources are described differently, are available in different formats, and are available through different technical means of data management.

In information extraction, customer master data for instance must be quickly, easily and uniformly be accessible, i.e. received from the data maintaining sources. In this process it is required to understand the meaning of the data, in order to query the correct data in the correct sequence. For example, in a service oriented architecture (SOA), maintenance on individual services responsible for such a task is extremely complex and hardly feasible.

Other problems result within the field of data interoperability when processing data automatically. In the context of the present invention, data interoperability refers to the ability to allow diverse, heterogeneous systems, to interact as seamlessly as possible to exchange information in an efficient way. This should for example be made for consolidation of costumer master data from different sources into a single business object as well as for transfer of costumer master data within the scope of a purchase operation. A particular problem is that required respectively necessary data objects are hold available in different data sources and may be subject to differing data descriptions.

Further, data agility calls for stable technical services based on heterogeneous data sources and heterogeneous systems. Data agility refers to the independence of interfaces and models, as well as a rapid integration of new data sources. The problem here lays in the continually changing data and data models, which hamper the desired data source homogeneity. Further, new data sources require completely new interfaces and furthermore interfaces which are adaptable according to changing requirements which result in continuously adaptions of services.

SUMMARY

Classic data processing is no longer possible due to the high complexity resulting from the amount of modified data growing continuously and growing faster, often termed "big data". In particular, manual or classical methods and solutions for data processing applications, such as comparing customer master data or purchase transaction data, cannot be guaranteed in a timely manner.

Conventional solution approaches require either manual modeling to create a data model (so-called master data management), manual modeling of an ontology, or manual definition of links (so-called mapping) between distributed data and the different technical systems. In data modeling and ontology modeling, business objects respectively the data objects described on an abstract level are linked with concrete data objects. This is referred to by the technical term mapping.

The problem in this is that the abstract data model description is often not consistent with the existing data and further, differing technical implementations on data storage systems only partially, if at all, allow these relationships to be captured. The lack of a technical implementation providing the required formats in the desired form cumulates in data loss. Moreover, data structures as well as the technical realization of data structures in IT systems change frequently and quickly, such that a data model and its mapping to real data is already outdated when the first implementation is completed, resulting in data errors originating from issues such as data consistency, data completion, data precision and/or data redundancy. Finally, the approach fails in practice due to the variety and complexity of data sources and IT systems in organizations and companies.

For the technical solution of this problem the present invention suggests an automated harmonization of data models describing integrated data from heterogeneous data sources. According to the invention, a semantic middleware is used for technical data integration on a system level and to conduct content analysis of data. As soon as data from the connected data sources is actively (e.g. via the so-called push principle) or passively (e.g. via the so-called pull principle) synchronized, the data and the data formats are aligned and transformed to enable interoperability, the content is semantically analyzed, semantically typed, attributes and meta data described, and all of these results are harmonized. In this manner, the superordinate, abstract data model (the so-called uniform information model) augments and harmonizes the integrated data incrementally, meaning step-by-step. This provides benefits in particular for applications and/or services using the uniform information model to query data with semantic parameters and use the queried data, without needing knowledge of the original heterogeneous description, format and source of that data.

Furthermore, an apparatus for automated harmonization of existing data and data models in different formats from various heterogeneous data sources or databases is proposed for the technical solution of the problem, comprising a semantic middleware for data integration and content analysis of that data.

An advantageous embodiment of the invention provides the use of data object similarity during the semantic analysis. This method provides benefits in searching for content objects with similar content. A content object in context of the present invention is a generic description of a data object, including documents with meta data. If a content object with an advantageously pre-defined or pre-definable similarity is found, the semantic typing and description of the matching attribute (meta data) is adopted. A semantic typing in the context of the present invention refers to the semantic classification of a content object, for example whether the content of a given content object describes a person, a message, a purchase, or a presentation. An attribute (meta data) in the context of the present invention refers to descriptive elements or meta data of a content object, such as a person's name, a message's sender, an order position, or a document's author.

BRIEF DESCRIPTION OF THE DRAWINGS

FIG. 4 shows, in principle, an embodiment for a mapping produced by an analysis described by this invention.

DETAILED DESCRIPTION

Figure 1A:
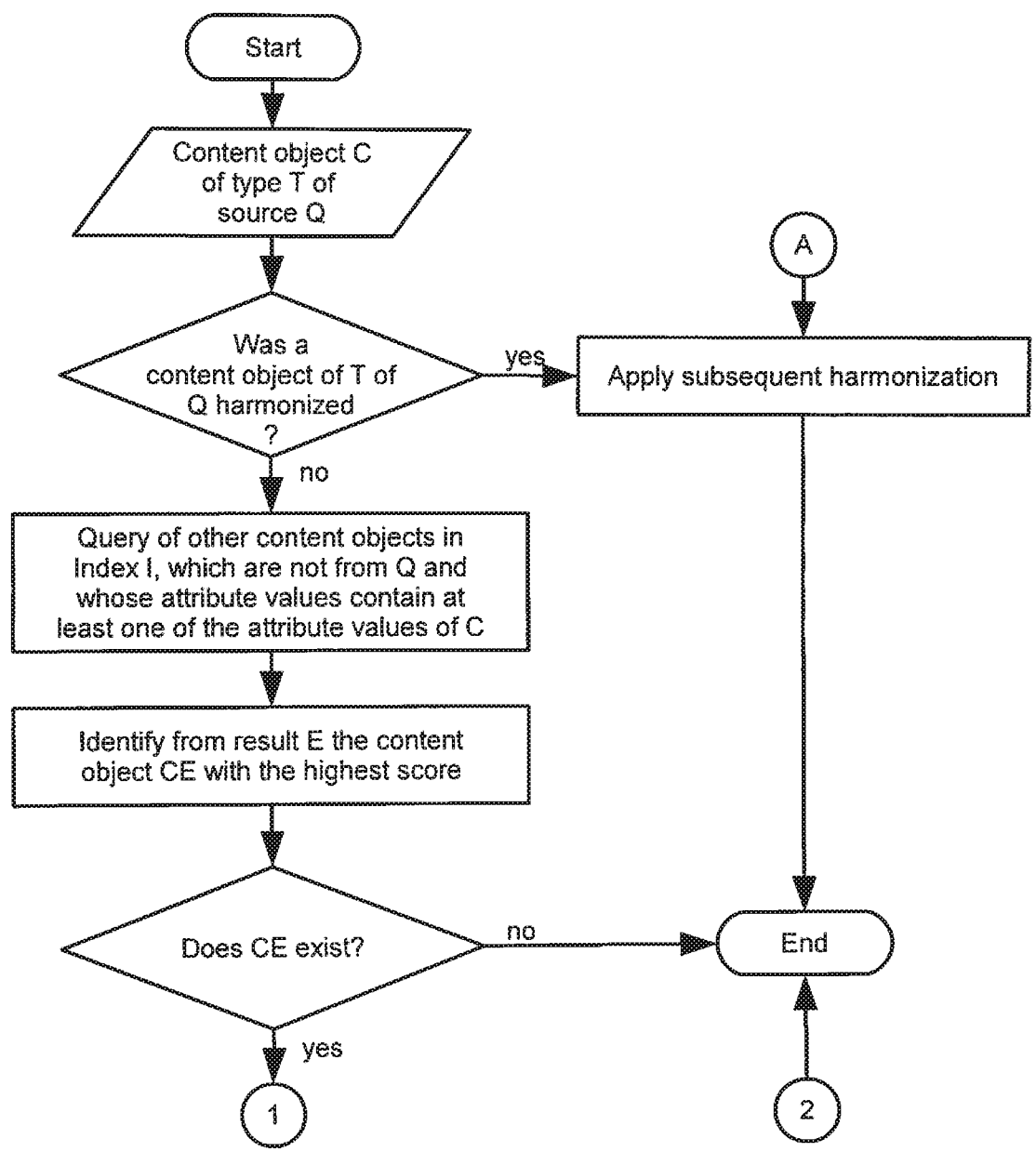
FIG. 1a and FIG. 1b show, in principle, an embodiment for a possible implementation of the described method in a flowchart diagram.
Figure 1B:
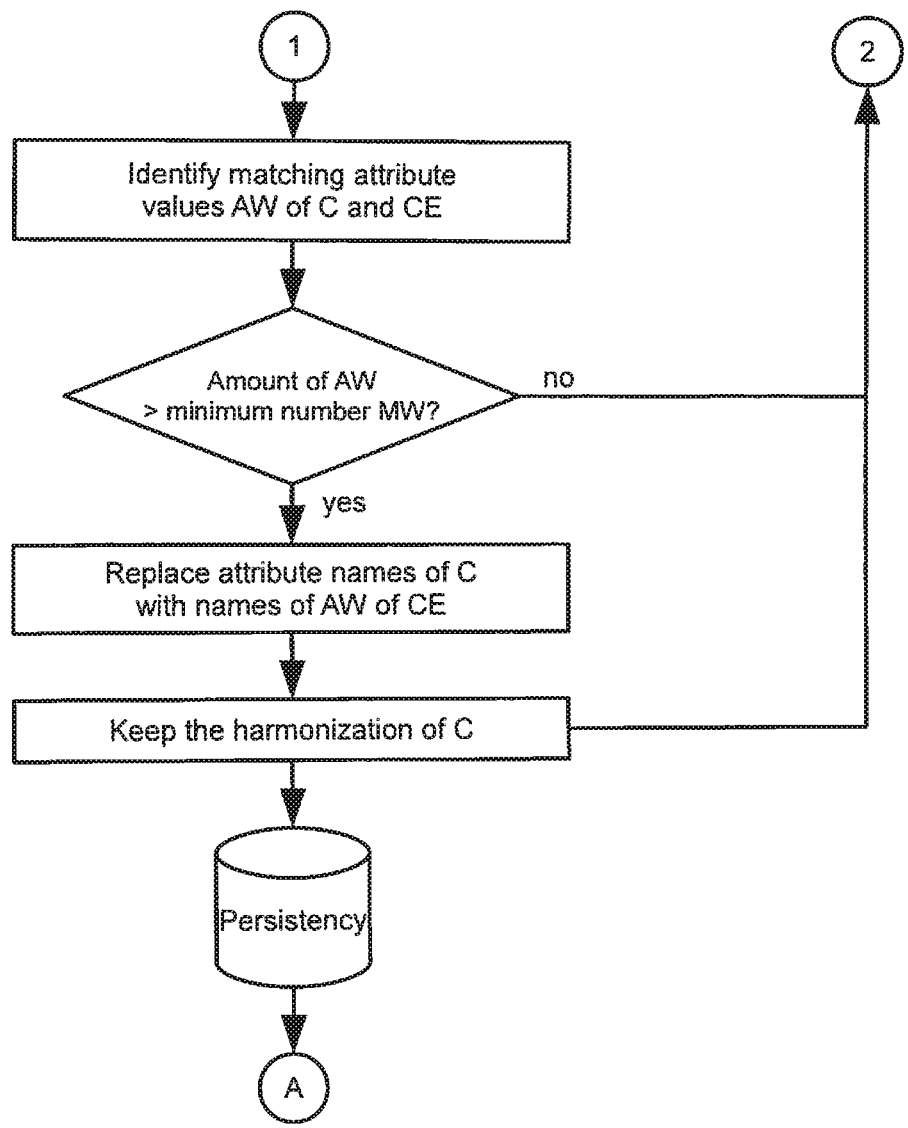

FIG. 1a and FIG. 1b show, in principle, an embodiment for a possible implementation of the described method in a flowchart diagram.

A further advantageous embodiment of the invention provides the use of similarities of data objects during the semantic analysis. This method differs from the implementation example described in FIG. 1a and FIG. 1b in that it searches for similarities across the entire contents of a particular type in a particular data source and the entire contents of another or the same type in another data source, as opposed to the similarity in the content between individual content objects. Advantageously a focus is particularly put on matching content attributes, notwithstanding whether they are contained within a single content object or not. If a minimum number of attribute values among the attributes in a content object being analyzed by the data harmonization according to the invention match, the matching attribute names and the corresponding content type are adopted for the analyzed content object.

Figure 2A:
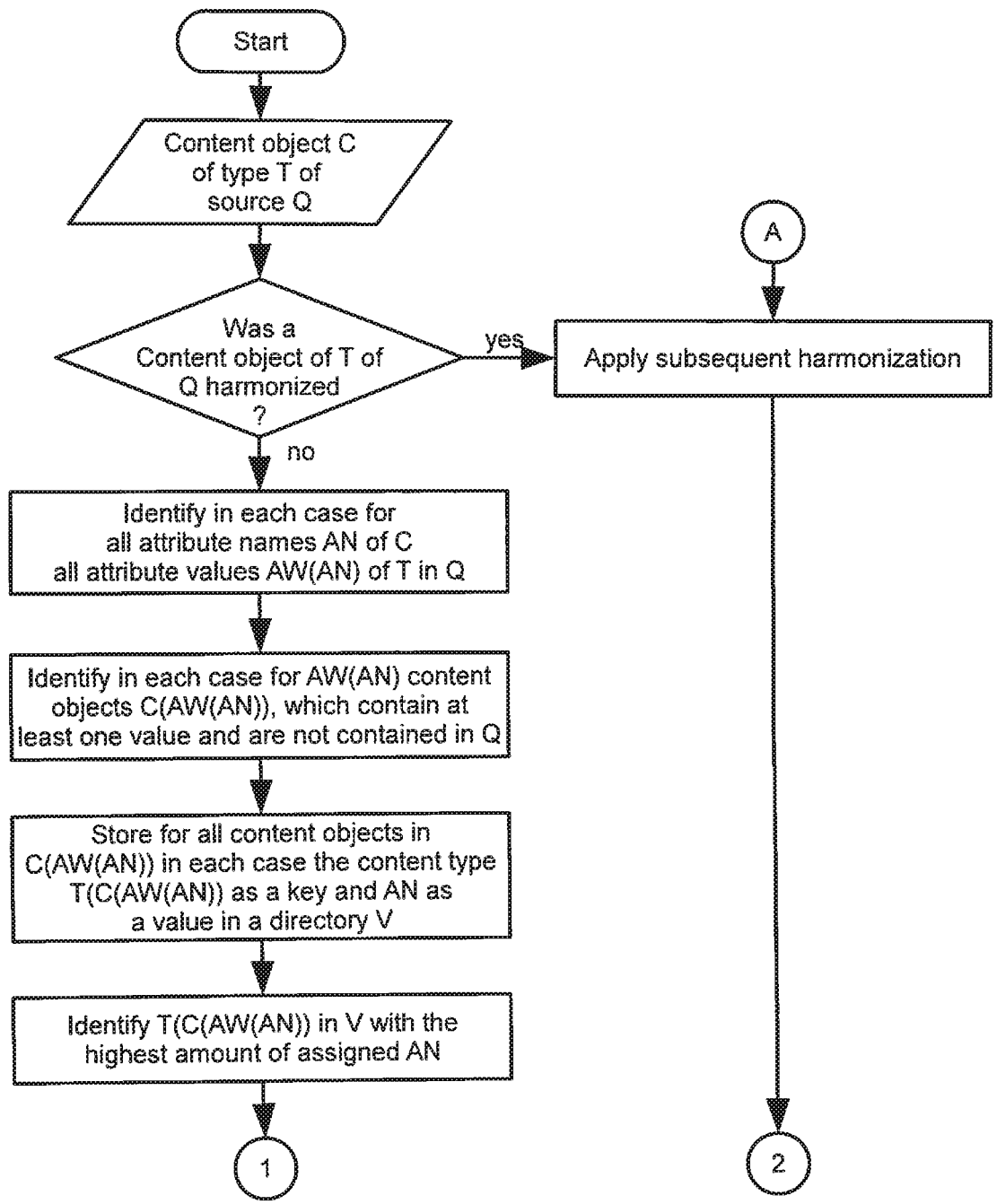
FIG. 2a and FIG. 2b show, in principle, an embodiment for a possible implementation of the described method in a flowchart diagram.
Figure 2B:
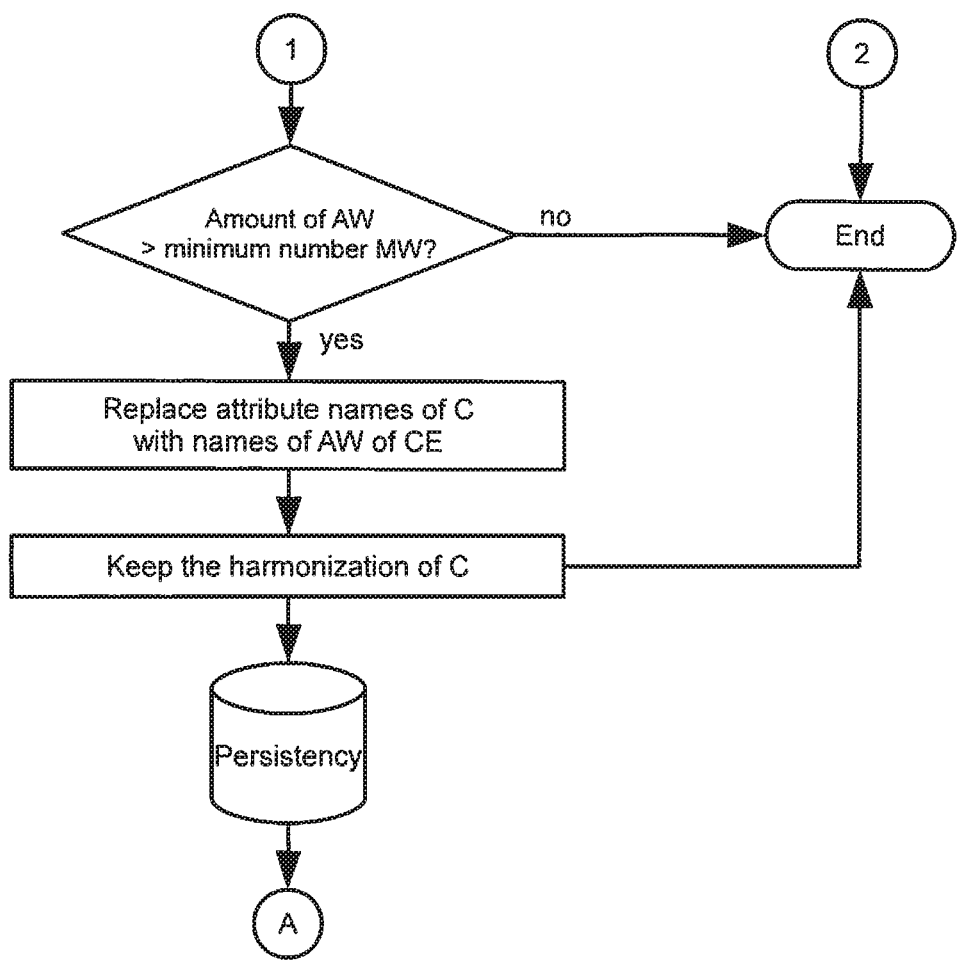

FIG. 2a and FIG. 2b show, in principle, an embodiment for a possible implementation of the described method in a flowchart diagram.

In practice the solution according to the embodiment of FIG. 2a and FIG. 2b demonstrates a better data harmonization than the implementation example of FIG. 1a and FIG. 1b, but requires more resources in the solution due to a larger number of executed queries and a larger number of stored/cached results, making it also more expensive, particularly in terms of resource usage.

A further advantageous embodiment of the invention provides the use of regular expressions to data objects in the semantic analysis. Advantageously the attribute values of a content object being analyzed are converted into regular expressions, and content objects with attribute values matching those regular expressions from other data sources are determined with assistance from a lookup mechanism, such as an index. If a relative minimum number of attribute values among the best results matches the regular expressions of the content object being analyzed, the type and attribute names of each result for that correlation are adopted in the inventive data harmonization.

Figure 3A:
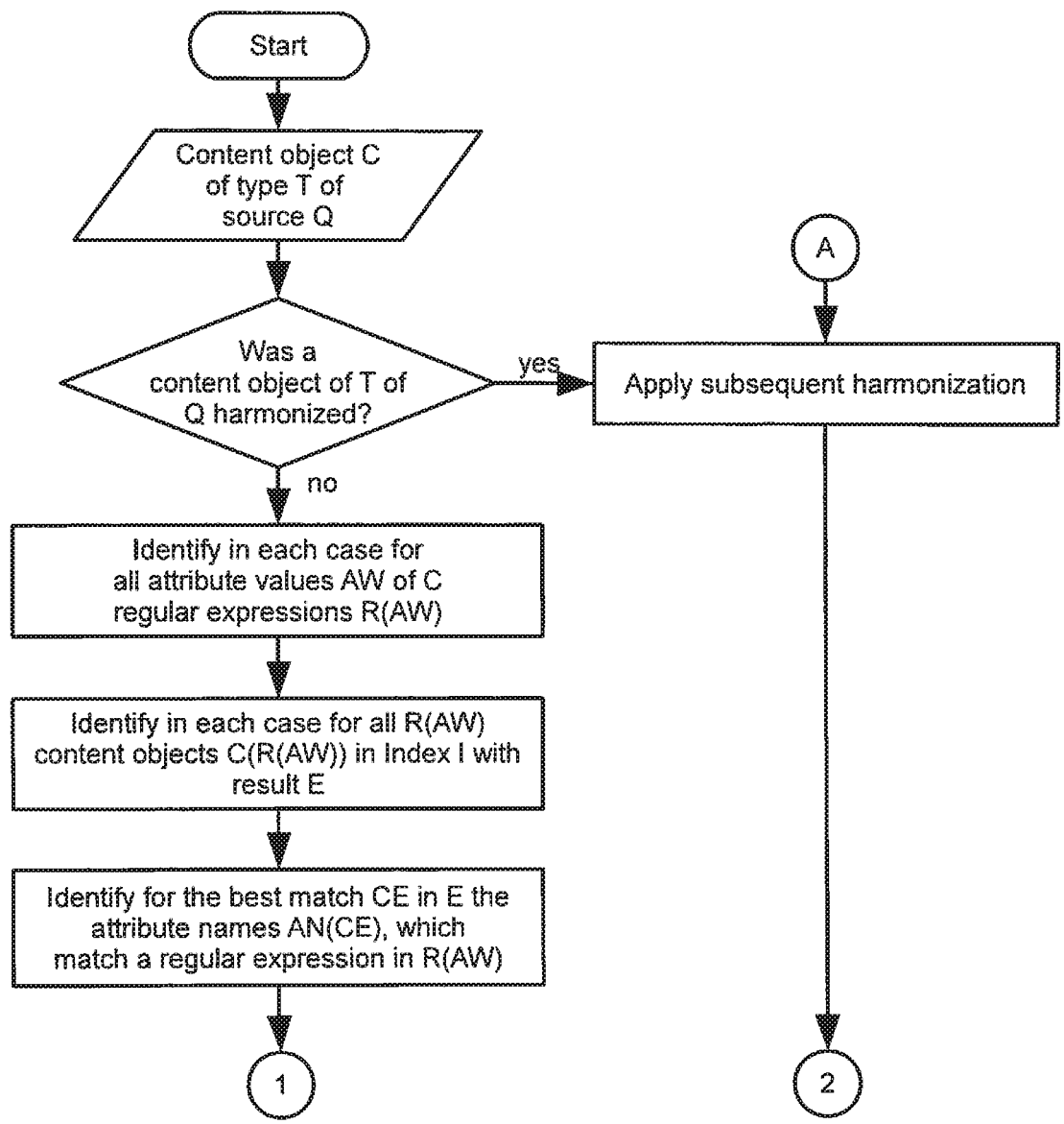
FIG. 3a and FIG. 3b show, in principle, an embodiment for a possible implementation of the described method in a flowchart diagram.
Figure 3B:
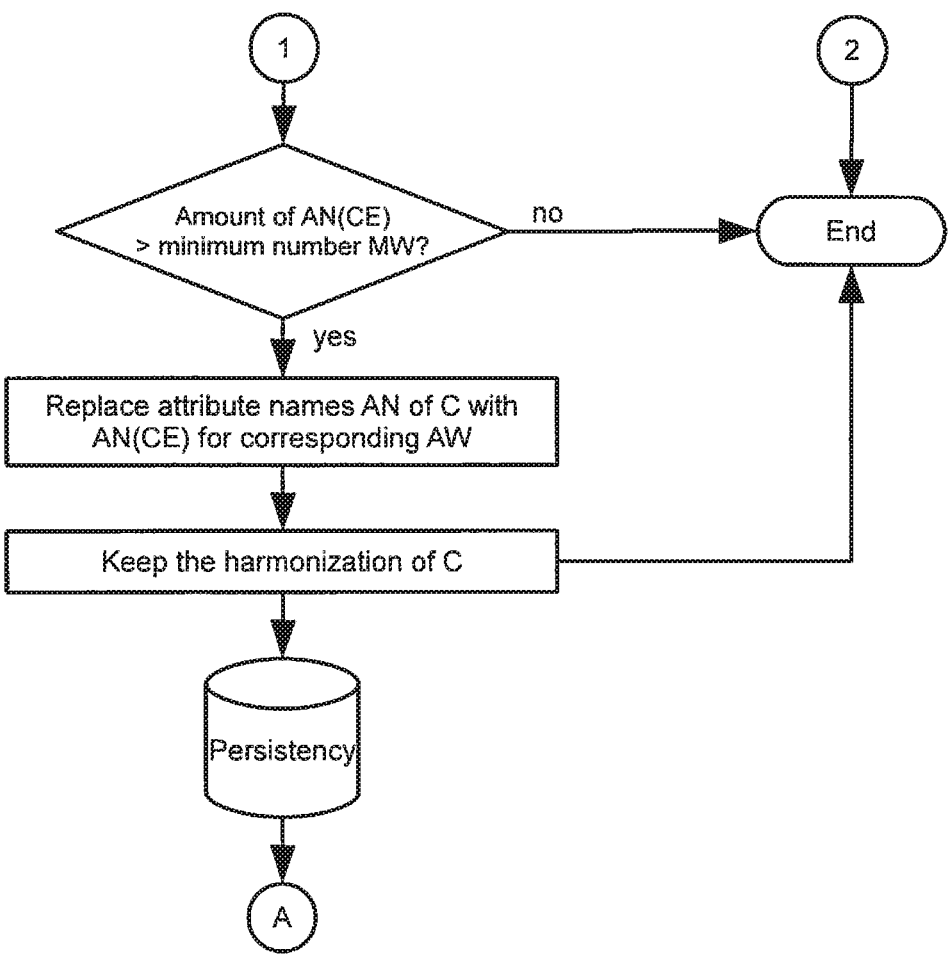

FIG. 3a and FIG. 3b show, in principle, an embodiment for a possible implementation of the described method in a flowchart diagram.

Advantageously it is provided according to a further embodiment of the invention that a validation of the best match across regular expressions matching attributes of an analyzed content object is done, where the attribute values of each said result are validated according to whether they match a regular expression for attribute values for attribute values within a content object, and whether this match is unique in that the attribute value only matches one regular expression of the said content object.

A further advantageous embodiment of the invention provides the application of content types. According to the method, content objects of another data source with matching attribute names are provisioned. If a relative minimum number of matching attribute names for the content type on a content object being analyzed exists, the content object is adopted. Advantageously this procedure may be employed as a so called "fall back"-solution.

FIG. 4 shows, in principle, an embodiment for a mapping produced by an analysis described by this invention.

Subject of the present invention is further an apparatus, designed as a data processing system, for the automated harmonization of data models from various heterogeneous data sources or databases, which is characterized by mechanisms that are trained and/or set up to execute the inventive method.

In a preferred embodiment of the apparatus it is designed to execute an inventive method by using similarities across data objects. This is done through a search for content objects with similar content, through the similarity comparison between the entirety of a particular type of content from a particular data source with the entirety of another or the same type of content from other data sources, or through applying regular expressions on data objects, wherein the attribute values in a content object to be analyzed are converted to regular expressions and determined with the assistance of an index containing content objects from other data sources.

In a further advantageous embodiment of the apparatus it is designed to synchronize and/or to index texts and/or values from meta data associated with data objects, whereby data objects are not stored/cached redundantly.

Furthermore the apparatus is preferentially designed to manage meta data from data objects, whereby the meta data is stored/cached for each instance of a data object class and as an aggregated class.

Advantageously the apparatus is designed as a data processing system to execute a meta data analysis for harmonizing derived abstract views of the instances, in the form of data object classes and their relationships. In doing so, the meta data analysis for harmonization can take place incrementally, as well as at fixed time intervals in the form of batch processing.

The embodiments of the invention illustrated in the figures of the drawing and the embodiments of the invention described in this context only serve the explanation of the invention and are not restrictive for the same.

What is claimed is:

1. A method for automated harmonization of existing data and/or data models being present in different formats from various data sources or databases, the method comprising:
   using a middleware for technical data integration on system level and a content-related data analysis,
   wherein data from connected data sources is synchronized with the middleware by synchronizing names and values from meta data associated with content objects,
   and wherein the data formats of the data are aligned and transformed to enable interoperability via content objects comprising semantic types and attributes with attribute names and attribute values, and wherein transforming the data to enable interoperability further includes semantic analysis of content objects to integrate the content objects into an harmonized abstract data model, the semantic analysis including, for each analyzed content object, identifying one or more similar content objects based on the one or more similar content objects having at least one attribute value that matches an attribute value of the analyzed content object, and in response to identifying the one or more similar content objects, adopting attribute names and content type from the one or more identified similar content objects for the analyzed content object within the abstract data model.

2. The method according to claim 1, wherein semantic analysis further includes using the similarity of the entirety of contents of a certain type of a certain data source compared with the entirety of contents of another or the same type of data sources, and upon existence of matching attribute values for a minimum number of attributes of an analyzed content object, the respective attribute names of matches and the respective content type are adopted for the analyzed content object within the abstract data model.

3. The method according to claim 1, wherein the data is transformed for interoperability by using regular expressions, wherein the attribute values of a content object to be analyzed is converted into regular expressions and content objects of other data sources, whose attribute values match the regular expressions, are obtained with support of an index, wherein in case a minimum number of attribute values of the best match matches the regular expressions of the content object to be analyzed, the type and attribute names of the respective match are utilized within the abstract data model.

4. The method according to claim 3, wherein the data is transformed for interoperability by validating the best match for regular expressions of the attributes of an analyzed content object, validating based on checking for the attribute values of each respective match to determine if the associated attribute values match a regular expression for attribute values of a content object, and that an attribute value corresponds to only one regular expression.

5. The method according to claim 1, wherein data is transformed for interoperability using content types, wherein the content objects of a second data source, the second data source different from the data source of the analyzed content object, are searched to identify content objects of the second data source which have matching attribute names, and upon existence of a predetermined minimum number of matching attribute names, the content type for the analyzed content object within the abstract data model is based on the identified content objects of the second data source.

6. A system for automated harmonization of existing data and/or data models being present in different formats from various data sources or databases, the system comprising:
   middleware for technical data integration on system level and a content-related data analysis,
   wherein data from connected data sources is synchronized with the middleware by synchronizing names and values from meta data associated with content objects,
   and wherein the data is transformed for interoperability by transforming and aligning the data format with semantic types, attribute values and/or attribute names,
   and wherein an harmonized abstract data model is derived that includes data types and data attributes with names, and wherein content associated with the data is incrementally harmonized based on querying content objects using an abstract data model to identify content objects with similar content based on the content objects having at least one matching attribute value and a different associated source, and adopting the semantic type and description as attribute names of the similar identified content objects within the abstract data model.

7. The system according to claim 6, wherein data is transformed for interoperability by using similarities of content objects, wherein the similarity of the entirety of contents of a certain type of a certain data source is compared with the entirety of contents of another or the same type of data sources, and upon existence of matching attribute values for a minimum number of attributes of an analyzed content object, the respective attribute names of matches and the respective content type are taken over into the abstract data model for the analyzed content object.

8. The system according to claim 6, wherein data is transformed for interoperability by a usage of regular expressions, wherein the attribute values of a content object to be analyzed are converted into regular expressions and content object of other data sources whose attribute values match the regular expressions are obtained with support of an index, wherein in case a minimum number of attribute values of the best match matches the regular expressions of the content object to be analyzed, the type and attribute names of the respective match are utilized within the abstract data model.

9. The system according to claim 8, wherein data is transformed for interoperability by a validation of the best match for regular expressions of the attributes of an analyzed content object, the validation including checking if the attribute values of each respective match matches a regular expressions for attribute values of a content object, and by determining that a given attribute value corresponds to only one regular expression.

10. The system according to claim 6, wherein data is transformed for interoperability using content types, wherein the content objects of a second data source different from the data source of an analyzed content object which have matching attribute names are identified, and upon existence of a predefined minimum number of matching attribute names, the content type for the content object which is currently analyzed is used within the abstract data model.

* * * * *